Figure 2:
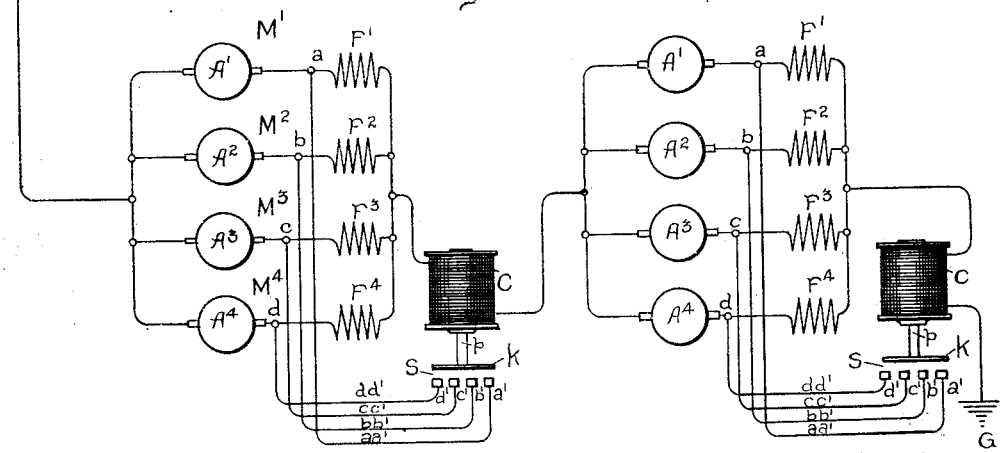

No. 687,261. Patented Nov. 26, 1901.
W. B. POTTER.
MOTOR CONTROL SYSTEM.
(Application filed June 15, 1901.)

(No Model.) 2 Sheets—Sheet 1.

Fig. 1.

Witnesses: Inventor.
William B. Potter.
by Albert H. Davis
Atty.

No. 687,261. Patented Nov. 26, 1901.
W. B. POTTER.
MOTOR CONTROL SYSTEM.
(Application filed June 15, 1901.)

(No Model.) 2 Sheets—Sheet 2.

Witnesses: Inventor.
William B. Potter.
by Albert G. Davis
Atty.

UNITED STATES PATENT OFFICE.

WILLIAM B. POTTER, OF SCHENECTADY, NEW YORK, ASSIGNOR TO GENERAL ELECTRIC COMPANY, A CORPORATION OF NEW YORK.

MOTOR-CONTROL SYSTEM.

SPECIFICATION forming part of Letters Patent No. 687,261, dated November 26, 1901.

Application filed June 15, 1901. Serial No. 64,648. (No model.)

*To all whom it may concern:*

Be it known that I, WILLIAM B. POTTER, a citizen of the United States, residing at Schenectady, county of Schenectady, State of New York, have invented certain new and useful Improvements in Motor-Control Systems, (Case No. 1,778,) of which the following is a specification.

This invention relates to the control of series electric motors, and has for its object the prevention of the exchange of excessive currents between motors in parallel when disconnected from the power-circuit and connected for reverse rotation but driven forward by the momentum of the machine or vehicle to which they are mechanically connected. This I propose to accomplish by preventing any of the motors from operating as generators under those conditions.

It is well known that in order to convert a series motor into a self-exciting generator it is necessary to reverse the direction of rotation or reverse the connections of either the armature or the field with relation to the other. If, therefore, a motor continues to run with no relative change in its armature and field connections after the supply-circuit has been cut off, it will have no tendency to operate as a generator. If, on the other hand, the relative connections of the armature and field are reversed, the motor will tend to build up voltage as a generator. When several motors are connected in parallel under these circumstances, they will all tend to build up voltage such that terminals of like polarity are connected together. Hence should the voltage of all the (now) generators build up equally there would be no exchange of current between them. It is, however, impossible to obtain this condition in practice, even when the motors are intended to be identical. Some will build up faster than the rest and force current through the latter against their weaker voltages, thus reversing their polarity and causing them to operate as generators in series with the former. The current flowing will then be limited only by the power available and the resistance of the motors and connections. In cases where the motors are connected to machines or vehicles having a large momentum this current is liable to become excessive and result in the burning out of the motors or connections. In any case the braking effect will cause a very sudden retardation which may be injurious, and generally is at least objectionable. If while this current is flowing the reversing-switch is opened, as often occurs in practice, the switch may be destroyed. In many cases of motor applications—as, for instance, on railway-cars, where it is necessary that the motors should be frequently reversed—such a condition of affairs may easily result. I propose to avoid the evils contemplated by providing a means for making connections which will divert practically all current from the fields when the supply-circuit is broken, so that even if the motors should be reversed the voltages generated would be due to the respective residual fields and the resulting current negligible. In order that the motors may operate successfully when running as such and receiving energy from the supply-circuit, it is necessary that the proposed connections be broken. I therefore provide a means for breaking these connections whenever current is received by the motors from the supply-circuit. To accomplish my end, I may employ an electromagnet which is energized whenever current is furnished from the source of supply to the motors, a plunger actuated by the electromagnet and carrying a disk, bar, or other form of electrical conductor, and electrical contacts so arranged that when the electromagnet is deënergized the conductor will rest upon the contacts, thus making connections, as described, for shunting the motor-fields; but on current being supplied to the motors, and the electromagnet consequently energized, the conductor will be drawn away from the contacts, thus opening those connections.

My invention is particularly useful in connection with train systems employing motor equipments of large power, and I have chosen to illustrate it in connection with a system of train control which is described in application of F. E. Case, Serial No. 57,176, filed April 24, 1901, and is a development of that described in reissued Letters Patent No. 11,852 to E. W. Rice, Jr. This developed system comprises four propelling-motors permanently connected in multiple on each of the end cars of a train and a train-control system consisting of identical controllers at the two ends of the train, a train-line consisting of one large conductor for completing the motor-circuits, and two small conductors for operating the reversing-switches, so organized that the motor equipments on the end cars may be connected in series or in multiple by means of the controller at either end of the train and both reversing-switches operated from the car from which, for the time being, the train is controlled.

Referring to the drawings which constitute a part of this specification, Figure 1 illustrates diagrammatically the controlling-switches, car-wiring, and motor equipment for each of the two end cars of a train equipped with the system of control as described and including my invention. Fig. 2 is intended to show more clearly the application of my invention when the motor equipments are in series, and Fig. 3 has the same object when they are in multiple.

Referring to Fig. 1, it will be noted that the controlling apparatus for each car comprises a main controlling-switch P for opening and closing the supply-circuit and controlling the supply of current to the motor-circuits, a reversing-switch R S, by means of which the relative direction of current-flow in the armature and field windings of the several motors on that individual car is reversed, a switch E, in which the arms $u$ and $v$ are insulated from each other for controlling the operation of the reversing-switches at both ends of the train, a switch D for connecting conductor $45^a$ to the ground G whenever switch E is in its "off" position and breaking that connection whenever switch E is in either of its operative positions, switch S, actuated by coil C, so that under certain conditions it will electrically connect the junctions of the fields and armatures of motors $M'$, $M^2$, $M^3$, and $M^4$ and under others will open these connections for the purposes as described, and a switch F, the function of which will appear later. Connections to source of supply are made to conductor T on one side and to the car-wheels and rails (indicated by G and commonly known as "ground") on the other, according to the general practice in the case of electrically-operated cars and trains.

$M'$, $M^2$, $M^3$, and $M^4$ in the drawings indicate the propelling-motors, constituting the motor equipment on each car.

The controlling-switch P is indicated with its contacts developed on a plane surface, as is customary in diagrammatically illustrating such structures, the small circles indicating fixed contacts or brushes and the rectangles the corresponding movable contacts. In actual construction the rectangular contacts are usually mounted on the surface of a cylinder and arranged to be rotated past fixed supports which carry the brushes indicated by the small circles.

Figure 3:
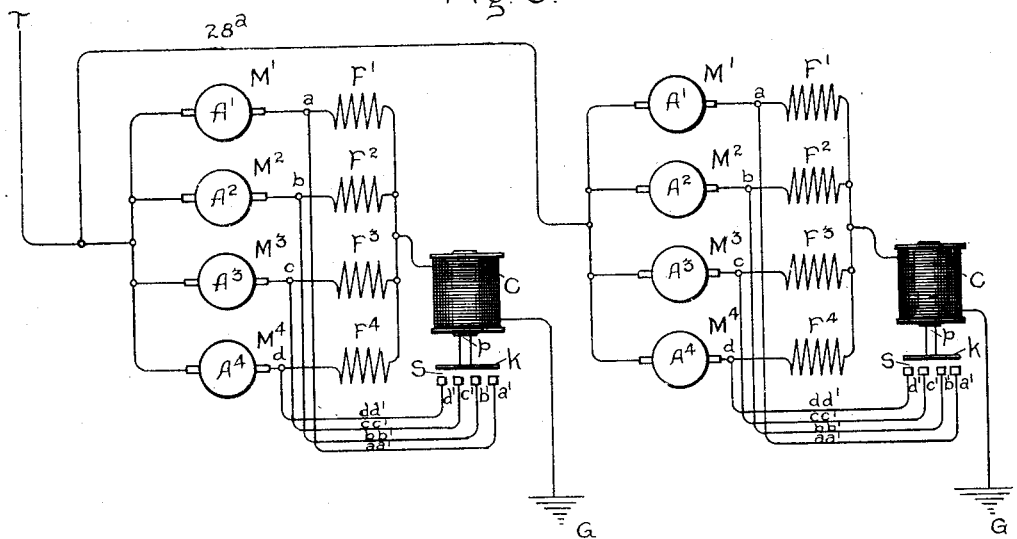

Having outlined the essential features of the system of train control in which I have chosen to illustrate my invention, I will now describe its operation in detail. Still referring to Fig. 1, suppose switches D and E are moved to the right, so that arm $u$ is in contact with terminal $e'$, switch F and reversing-switch R S in position shown, and main controller P in the off position. The conductor K will then rest upon contacts $a'$, $b'$, $c'$, and $d'$, thus connecting together the common terminals $a$, $b$, $c$, and $d$ of the armatures $A'$, $A^2$, $A^3$, and $A^4$ and the fields $F'$, $F^2$, $F^3$, and $F^4$ of the motors $M'$, $M^2$, $M^3$, and $M^4$ through the conductors $a\,a'$, $b\,b'$, $c\,c'$, and $d\,d'$. If now the main controlling-switch P is moved to its first operative position, so that line 1 1 is over the stationary contacts, the motor-circuit can be traced as follows: Starting from trolley or line conductor T, the circuit leads through contacts 1 and 2 of the main controlling-switch to resistance R, and thence through the conductor $11^a$ to a common connection uniting terminals 39 and 40 of the motor-reversing switch. From these points the circuit continues through all of the motors $M'$ to $M^4$, inclusive, in multiple, to the conductor $43^a$, through coil C to conductor $44^a$, which is connected through switch F to conductor $45^a$ and $46^a$, and through contacts 14 and 13 of the main controlling-switch to conductor $13^a$, which leads to train-conductor $28^a$, and thus to the motor-equipped car at the other or rear end of the train. Noting that the equipments at the ends of the train are identical, we may consider the diagram of Fig. 1 as applying also to the rear car. We may now continue the circuit from $28^a$ through contacts 13 and 12 of the main controlling-switch to the terminals 39 and 40 of the reversing-switch, thence through the motor-circuits to the conductor $43^a$ through coil C to conductor $44^a$, thence through switch F to conductor $45^a$, and through switch D to ground G, it being understood that both the main controlling-switch P and the switch E are in the off position on the rear car, thus bringing the cross-connected contacts $f'$ $f'$ into engagement with fixed contacts 12 and 13 of the main controlling-switch P and the member $f$ of the switch D into engagement with the terminal to which conductor $45^a$ is connected. The equipments on the two cars will thus be connected in series between the trolley and ground, with the resistance R and coils C in circuit. Immediately upon the making of this circuit the coils C, being energized, lift the plungers $p$, and with them conductors $k$, so that connections between contacts $a'$, $b'$, $c'$, and $d'$, which previous to the energizing of coils C were made by the conductor $k$, resting upon them, are now broken, leaving the motors connected in the usual way. Further movement of the main controlling-switch up to the position where the fixed contacts lie along the line 9 9 operates in a well-known manner to cut out the resistance R. In the position 9 9 resistance R is all cut out and the motors are connected as shown in Fig. 2. If the switch is moved still farther to the position 10 10, the train-conductor $28^a$ is connected through the conductor $13^a$, stationary contacts 12 and 13, and resistance R to trolley T, and the conductor $46^a$ to ground G through the stationary contacts 15 and 16, thus connecting the two motor equipments (each in series with a coil C) in multiple with each other and in series with resistance R. Further movement cuts out resistance R until in the last position 18 18 all the resistance is cut out and all the motors of the train are connected in multiple between the trolley and ground, as shown in Fig. 3. The resistance of coils C (shown in series with each motor equipment) will ordinarily be so low as to have no appreciable effect on the operation of the motors. If it is desired to operate one equipment only, the switch F on the car in question is thrown into the lower position, thus removing the equipment from electrical connection with the train-line $28^a$ and connecting it through the conductor $38^a$ to ground. Movement of the main controlling-switch P will then operate to supply current through resistance R to the motors of this equipment only and to gradually cut out the resistance as it is moved forward, the motor connections being as shown in Fig. 3, if we regard the conductor $28^a$ as severed and the left-hand portion of the diagram as the equipment under consideration. If it is desired to reverse the direction of the train, switch E (see Fig. 1) is moved to the left until it occupies the position as shown by the dotted lines. Arm $u$ will then be in contact with terminal $e^2$. A circuit can now be traced from trolley T through arm $u$, terminal $e^2$, conductors $18^a$ and $18^b$, and contacts on reversing-switch cylinder, as is clearly shown, and through solenoid $h$ to ground G. The solenoid $h$ being energized will attract its armature, which is operatively connected through the crank I to reversing-switch cylinder, and thus actuate the cylinder to reverse the motor-armature connections in a well-known manner. If now the switch E be returned to its original position, a similar circuit may be traced through solenoid $g$, which will then operate to return the cylinder to its original position, thus restoring the original armature connections. It will be seen that any movement of the switch E will operate the reversing-switches at both ends of the train in precisely the same manner and simultaneously, since they are connected in parallel by the train-lines $18^a$ and $19^a$.

The arm $v$ of switch E is provided, so that when either $18^a$ or $19^a$ is connected to trolley T the other will be connected to ground G, so that if in any way these lines become accidentally connected in the train-line or elsewhere circuit will be made directly to ground without passing through the reverser-switch-actuating coil, thus preventing the operation of the switch at inopportune times.

An inspection of the foregoing description and the drawings will show that in all cases coils C are in series with their respective motor equipments, so that it is impossible for an external circuit to be made through the motors without energizing these coils, and consequently breaking the connection between contacts $a'$, $b'$, $c'$, and $d'$. Conversely, if the external circuit be broken coils C will be deenergized and electrical connection made between these contacts in a manner as before described. Suppose now that a train on which the system I have described is installed is nearing the end of a trip and the motorman having cut off the external source of power desires to be in readiness to proceed in the opposite direction, and therefore reverses his motors before the train has come to a stop. The conditions are now right for the motors to operate as generators with consequences as foreseen were it not for the operation of my invention in the manner and for purposes as described.

While I have described a system of railway motor control as illustrating the application of my invention, it is to be understood that I consider only that part of it as my invention which is concerned in the closing and opening of electrical connections between the functions of the armatures and fields of the respective motors. On the other hand, I do not wish to limit my invention to systems of this kind, as I realize that there are many other instances of motor applications where it could be advantageously applied. I also realize that the establishing and opening of such connections as described and for purposes as stated can be accomplished by other means than those described without departing from the spirit of my invention, and therefore I do not wish to be limited to the particular means specified.

What I claim as new, and desire to secure by Letters Patent of the United States, is—

1. The combination of a plurality of series motors connected in parallel, a supply-circuit, and means operated by the breaking of the supply-circuit for diverting current from the fields of said motors.

2. The combination of a plurality of series motors connected in parallel, a supply-circuit, connections for diverting current from the fields of the motors and means responding to the making and breaking of the supply-circuit for controlling said connections.

3. The combination of a plurality of series motors connected in parallel, a supply-circuit, connections between the junctions of the armatures and fields of the motors, and means responding to the making and breaking of the supply-circuit for controlling said connections.

4. The combination of a plurality of series motors connected in parallel, a supply-circuit, connections between the junctions of the armatures and fields of the motors, and a switch responding to the making and breaking of the supply-circuit for controlling said connections.

5. The combination of a plurality of series motors connected in parallel, a supply-circuit, connections between the junctions of the armatures and fields of the motors, and an electromagnetic switch responding to the making and breaking of the supply-circuit for controlling said connections.

6. The combination of a plurality of series motors connected in parallel, an electromagnet in series with them, contacts connected to the junctions of the fields and armatures of the motors, and an electrical conductor actuated by the electromagnet so arranged that when the electromagnet is deënergized the electrical conductor connects the contacts together and when energized the electrical conductor is removed from connection with the contacts.

7. The combination of a plurality of series motors connected in parallel, a supply-circuit, a controller for opening and closing the supply-circuit, and means for completing connections to divert current from the fields of the motors whenever the controller is operated to open the supply-circuit.

In witness whereof I have hereunto set my hand this 13th day of June, 1901.

WILLIAM B. POTTER.

Witnesses:
BENJAMIN B. HULL,
FRED RUSS.